(12) United States Patent
Thatte et al.

(10) Patent No.: US 8,321,450 B2
(45) Date of Patent: *Nov. 27, 2012

(54) STANDARDIZED DATABASE CONNECTIVITY SUPPORT FOR AN EVENT PROCESSING SERVER IN AN EMBEDDED CONTEXT

(75) Inventors: Mohit Thatte, San Francisco, CA (US); Sandeep Bishnoi, Sirsa (IN); Namit Jain, Santa Clara, CA (US); Anand Srinivasan, Bangalore (IN); Shailendra Mishra, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 422 days.

This patent is subject to a terminal disclaimer.

(21) Appl. No.: 12/506,891

(22) Filed: Jul. 21, 2009

(65) Prior Publication Data

US 2011/0022618 A1    Jan. 27, 2011

(51) Int. Cl.
G06F 17/30 (2006.01)
(52) U.S. Cl. ............... 707/769; 707/771; 707/E17.014; 719/328
(58) Field of Classification Search ............ 719/328
See application file for complete search history.

(56) References Cited

U.S. PATENT DOCUMENTS

| | | |
|---|---|---|
| 4,996,687 A | 2/1991 | Hess et al. |
| 5,051,947 A | 9/1991 | Messenger et al. |
| 5,495,600 A | 2/1996 | Terry et al. |
| 5,706,494 A | 1/1998 | Cochrane et al. |
| 5,802,262 A | 9/1998 | Van De Vanter |
| 5,802,523 A | 9/1998 | Jasuja et al. |
| 5,822,750 A | 10/1998 | Jou et al. |
| 5,826,077 A | 10/1998 | Blakeley et al. |
| 5,857,182 A | 1/1999 | DeMichiel et al. |
| 5,937,401 A | 8/1999 | Hillegas |
| 6,006,235 A | 12/1999 | Macdonald et al. |
| 6,041,344 A | 3/2000 | Bodamer et al. |
| 6,081,801 A | 6/2000 | Cochrane et al. |
| 6,092,065 A | 7/2000 | Floratos et al. |
| 6,108,666 A | 8/2000 | Floratos et al. |
| 6,128,610 A | 10/2000 | Srinivasan et al. |
| 6,263,332 B1 | 7/2001 | Nasr et al. |
| 6,278,994 B1 | 8/2001 | Fuh et al. |
| 6,282,537 B1 | 8/2001 | Madnick et al. |
| 6,353,821 B1 | 3/2002 | Gray |
| 6,367,034 B1 | 4/2002 | Novik et al. |

(Continued)

FOREIGN PATENT DOCUMENTS

EP    1241589 A2    9/2002

(Continued)

OTHER PUBLICATIONS

U.S. Appl. No. 12/506,905, filed Jul. 21, 2009, Thatte et al.

(Continued)

*Primary Examiner* — Anteneh Girma
(74) *Attorney, Agent, or Firm* — Kilpatrick Townsend & Stockton LLP (57) ABSTRACT

Techniques for facilitating communication between one or more client applications and an event processing server. In one set of embodiments, a framework is provided that enables a client application to communicate with an event processing server via a standard database connectivity API, such as Java Database Connectivity (JDBC).

15 Claims, 6 Drawing Sheets

U.S. PATENT DOCUMENTS

| | | |
|---|---|---|
| 6,370,537 B1 | 4/2002 | Gilbert et al. |
| 6,389,436 B1 | 5/2002 | Chakrabarti et al. |
| 6,438,540 B2 | 8/2002 | Nasr et al. |
| 6,449,620 B1 | 9/2002 | Draper et al. |
| 6,453,314 B1 | 9/2002 | Chan et al. |
| 6,507,834 B1 | 1/2003 | Kabra et al. |
| 6,523,102 B1 | 2/2003 | Dye et al. |
| 6,546,381 B1 | 4/2003 | Subramanian et al. |
| 6,708,186 B1 | 3/2004 | Claborn et al. |
| 6,766,330 B1 | 7/2004 | Chen et al. |
| 6,785,677 B1 | 8/2004 | Fritchman |
| 6,826,566 B2 | 11/2004 | Lewak et al. |
| 6,836,778 B2 | 12/2004 | Manikutty et al. |
| 6,856,981 B2 | 2/2005 | Wyschogrod et al. |
| 6,985,904 B1 | 1/2006 | Kaluskar et al. |
| 7,020,696 B1 | 3/2006 | Perry et al. |
| 7,093,023 B2 | 8/2006 | Lockwood et al. |
| 7,145,938 B2 | 12/2006 | Takeuchi et al. |
| 7,146,352 B2 | 12/2006 | Brundage et al. |
| 7,224,185 B2 | 5/2007 | Campbell et al. |
| 7,225,188 B1 | 5/2007 | Gai et al. |
| 7,236,972 B2 | 6/2007 | Lewak et al. |
| 7,305,391 B2 | 12/2007 | Wyschogrod et al. |
| 7,308,561 B2 | 12/2007 | Cornet et al. |
| 7,310,638 B1 | 12/2007 | Blair |
| 7,376,656 B2 | 5/2008 | Blakeley et al. |
| 7,383,253 B1 | 6/2008 | Tsimelzon et al. |
| 7,403,959 B2 | 7/2008 | Nishizawa et al. |
| 7,430,549 B2 | 9/2008 | Zane et al. |
| 7,451,143 B2 | 11/2008 | Sharangpani et al. |
| 7,483,976 B2 | 1/2009 | Ross |
| 7,516,121 B2 | 4/2009 | Liu et al. |
| 7,519,577 B2 | 4/2009 | Brundage et al. |
| 7,552,365 B1 | 6/2009 | March et al. |
| 7,567,953 B2 | 7/2009 | Kadayam et al. |
| 7,613,848 B2 | 11/2009 | Amini et al. |
| 7,620,851 B1 | 11/2009 | Leavy et al. |
| 7,630,982 B2 | 12/2009 | Boyce |
| 7,636,703 B2 | 12/2009 | Taylor |
| 7,673,065 B2 | 3/2010 | Srinivasan et al. |
| 7,676,461 B2 | 3/2010 | Chikodrov et al. |
| 7,689,622 B2 | 3/2010 | Liu et al. |
| 7,702,629 B2 | 4/2010 | Cytron et al. |
| 7,716,210 B2 | 5/2010 | Ozcan et al. |
| 7,739,265 B2 | 6/2010 | Jain et al. |
| 7,805,445 B2 | 9/2010 | Boyer et al. |
| 7,814,111 B2 | 10/2010 | Levin |
| 7,827,190 B2 | 11/2010 | Pandya |
| 7,870,124 B2 | 1/2011 | Liu et al. |
| 7,912,853 B2 | 3/2011 | Agrawal |
| 7,917,299 B2 | 3/2011 | Buhler et al. |
| 7,930,322 B2 | 4/2011 | MacLennan |
| 7,953,728 B2 | 5/2011 | Hu et al. |
| 7,979,420 B2 | 7/2011 | Jain et al. |
| 7,991,766 B2 | 8/2011 | Srinivasan et al. |
| 7,996,388 B2 | 8/2011 | Jain et al. |
| 8,019,747 B2 | 9/2011 | Srinivasan et al. |
| 2002/0023211 A1 | 2/2002 | Roth et al. |
| 2002/0049788 A1 | 4/2002 | Lipkin et al. |
| 2002/0116371 A1 | 8/2002 | Dodds et al. |
| 2002/0133484 A1 | 9/2002 | Chau et al. |
| 2002/0169788 A1 | 11/2002 | Lee et al. |
| 2003/0037048 A1 | 2/2003 | Kabra et al. |
| 2003/0065655 A1 | 4/2003 | Syeda-Mahmood |
| 2003/0065659 A1 | 4/2003 | Agarwal et al. |
| 2003/0200198 A1 | 10/2003 | Chandrasekar et al. |
| 2003/0229652 A1 | 12/2003 | Bakalash et al. |
| 2003/0236766 A1 | 12/2003 | Fortuna et al. |
| 2004/0010496 A1* | 1/2004 | Behrendt et al. ............... 707/10 |
| 2004/0024773 A1 | 2/2004 | Stoffel et al. |
| 2004/0064466 A1 | 4/2004 | Manikutty et al. |
| 2004/0073534 A1 | 4/2004 | Robson |
| 2004/0167864 A1 | 8/2004 | Wang et al. |
| 2004/0168107 A1 | 8/2004 | Sharp et al. |
| 2004/0177053 A1 | 9/2004 | Donoho et al. |
| 2004/0220912 A1 | 11/2004 | Manikutty et al. |
| 2004/0220927 A1 | 11/2004 | Murthy et al. |
| 2004/0267760 A1 | 12/2004 | Brundage et al. |
| 2005/0010896 A1 | 1/2005 | Meliksetian et al. |
| 2005/0055338 A1 | 3/2005 | Warner et al. |
| 2005/0065949 A1 | 3/2005 | Warner et al. |
| 2005/0096124 A1 | 5/2005 | Stronach |
| 2005/0097128 A1 | 5/2005 | Ryan et al. |
| 2005/0154740 A1 | 7/2005 | Day et al. |
| 2005/0174940 A1 | 8/2005 | Iny |
| 2005/0177579 A1 | 8/2005 | Blakeley et al. |
| 2005/0204340 A1 | 9/2005 | Ruminer et al. |
| 2005/0229158 A1 | 10/2005 | Thusoo et al. |
| 2005/0273450 A1 | 12/2005 | McMillen et al. |
| 2006/0015482 A1 | 1/2006 | Beyer et al. |
| 2006/0031204 A1 | 2/2006 | Liu et al. |
| 2006/0085592 A1 | 4/2006 | Ganguly et al. |
| 2006/0100969 A1 | 5/2006 | Wang et al. |
| 2006/0106786 A1 | 5/2006 | Day et al. |
| 2006/0106797 A1 | 5/2006 | Srinivasa et al. |
| 2006/0155719 A1 | 7/2006 | Mihaeli et al. |
| 2006/0212441 A1 | 9/2006 | Tang et al. |
| 2006/0224576 A1 | 10/2006 | Liu et al. |
| 2006/0230029 A1 | 10/2006 | Yan |
| 2006/0235840 A1 | 10/2006 | Manikutty et al. |
| 2006/0242180 A1 | 10/2006 | Graf et al. |
| 2006/0294095 A1 | 12/2006 | Berk et al. |
| 2007/0016467 A1 | 1/2007 | John et al. |
| 2007/0022092 A1 | 1/2007 | Nishizawa et al. |
| 2007/0039049 A1 | 2/2007 | Kupferman et al. |
| 2007/0118600 A1 | 5/2007 | Arora |
| 2007/0136239 A1 | 6/2007 | Lee et al. |
| 2007/0136254 A1 | 6/2007 | Choi et al. |
| 2007/0226239 A1 | 9/2007 | Johnson et al. |
| 2007/0271280 A1 | 11/2007 | Chandasekaran |
| 2007/0294217 A1 | 12/2007 | Chen et al. |
| 2008/0005093 A1 | 1/2008 | Liu et al. |
| 2008/0010241 A1 | 1/2008 | McGoveran |
| 2008/0028095 A1 | 1/2008 | Lang et al. |
| 2008/0034427 A1 | 2/2008 | Cadambi et al. |
| 2008/0046401 A1 | 2/2008 | Lee et al. |
| 2008/0077570 A1 | 3/2008 | Tang et al. |
| 2008/0077587 A1 | 3/2008 | Wyschogrod et al. |
| 2008/0082484 A1 | 4/2008 | Averbuch et al. |
| 2008/0082514 A1 | 4/2008 | Khorlin et al. |
| 2008/0114787 A1 | 5/2008 | Kashiyama et al. |
| 2008/0120283 A1 | 5/2008 | Liu et al. |
| 2008/0195577 A1 | 8/2008 | Fan et al. |
| 2008/0301124 A1 | 12/2008 | Alves et al. |
| 2008/0301125 A1 | 12/2008 | Alves et al. |
| 2008/0301135 A1 | 12/2008 | Alves et al. |
| 2008/0301256 A1 | 12/2008 | McWilliams et al. |
| 2009/0006320 A1 | 1/2009 | Ding et al. |
| 2009/0019045 A1 | 1/2009 | Amir et al. |
| 2009/0043729 A1 | 2/2009 | Liu et al. |
| 2009/0070785 A1* | 3/2009 | Alvez et al. .................. 719/318 |
| 2009/0070786 A1 | 3/2009 | Alves et al. |
| 2009/0076899 A1 | 3/2009 | Gbodimowo |
| 2009/0100029 A1 | 4/2009 | Jain et al. |
| 2009/0106189 A1 | 4/2009 | Jain et al. |
| 2009/0106190 A1 | 4/2009 | Srinivasan et al. |
| 2009/0106198 A1 | 4/2009 | Srinivasan et al. |
| 2009/0106214 A1 | 4/2009 | Jain et al. |
| 2009/0106215 A1 | 4/2009 | Jain et al. |
| 2009/0106218 A1 | 4/2009 | Srinivasan et al. |
| 2009/0106321 A1 | 4/2009 | Das et al. |
| 2009/0106440 A1 | 4/2009 | Srinivasan et al. |
| 2009/0112802 A1 | 4/2009 | Srinivasan et al. |
| 2009/0112803 A1 | 4/2009 | Srinivasan et al. |
| 2009/0112853 A1 | 4/2009 | Nishizawa et al. |
| 2009/0125550 A1 | 5/2009 | Barga et al. |
| 2009/0144696 A1 | 6/2009 | Andersen |
| 2009/0187584 A1 | 7/2009 | Johnson et al. |
| 2009/0216747 A1 | 8/2009 | Li et al. |
| 2009/0216860 A1 | 8/2009 | Li et al. |
| 2009/0245236 A1 | 10/2009 | Scott et al. |
| 2009/0248749 A1 | 10/2009 | Gu et al. |
| 2009/0265324 A1 | 10/2009 | Mordvinov et al. |
| 2010/0017379 A1 | 1/2010 | Naibo et al. |
| 2010/0023498 A1 | 1/2010 | Dettinger et al. |
| 2010/0049710 A1 | 2/2010 | Young, Jr. et al. |
| 2010/0057663 A1 | 3/2010 | Srinivasan et al. |

| | | | |
|---|---|---|---|
| 2010/0057727 | A1 | 3/2010 | Srinivasan et al. |
| 2010/0057735 | A1 | 3/2010 | Srinivasan et al. |
| 2010/0057736 | A1 | 3/2010 | Srinivasan et al. |
| 2010/0057737 | A1 | 3/2010 | Srinivasan et al. |
| 2010/0094838 | A1* | 4/2010 | Kozak .................... 707/705 |
| 2010/0161589 | A1 | 6/2010 | Nica et al. |
| 2010/0223305 | A1 | 9/2010 | Park et al. |
| 2010/0223437 | A1 | 9/2010 | Park et al. |
| 2010/0223606 | A1 | 9/2010 | Park et al. |
| 2011/0022618 | A1 | 1/2011 | Thatte et al. |
| 2011/0023055 | A1 | 1/2011 | Thatte et al. |
| 2011/0029484 | A1 | 2/2011 | Park et al. |
| 2011/0029485 | A1 | 2/2011 | Park et al. |
| 2011/0055192 | A1 | 3/2011 | Tang et al. |
| 2011/0093162 | A1 | 4/2011 | Nielsen et al. |
| 2011/0161321 | A1 | 6/2011 | de Castro Alves et al. |
| 2011/0161328 | A1 | 6/2011 | Park et al. |
| 2011/0161352 | A1 | 6/2011 | de Castro Alves et al. |
| 2011/0161356 | A1 | 6/2011 | de Castro Alves et al. |
| 2011/0196891 | A1 | 8/2011 | de Castro Alves et al. |
| 2011/0270879 | A1 | 11/2011 | Srinivasan et al. |
| 2012/0041934 | A1 | 2/2012 | Srinivasan et al. |

FOREIGN PATENT DOCUMENTS

| | | | |
|---|---|---|---|
| WO | WO 00/49533 | A2 | 8/2000 |
| WO | WO 01/59602 | A2 | 8/2001 |
| WO | WO 01/65418 | A2 | 9/2001 |
| WO | WO 03/030031 | A2 | 4/2003 |

OTHER PUBLICATIONS

Arasu, A., et al., "The CQL Continuous Query Language: Semantic Foundations and Query Execution," Stanford University, pp. 1-32, at URL: http://www.cs.uwaterloo.ca/~david/cs848/stream-cql.pdf.
Conway, N., "An Introduction to Data Stream Query Processing," Truviso, Inc., May 24, 2007, 71 pages, at URL: http://neilconway.org/talks/stream_intro.pdf.
McReynolds, S., "Complex Event Processing in the Real World," an Oracle White Paper, Sep. 2007, 13 pages, at URL: http://www.oracle.com/technologies/soa/docs/oracle-complex-event-processing.pdf.
"StreamBase New and Noteworthy," StreamBase, dated Jan. 12, 2010, 878 pages.
Non-Final Office Action for U.S. Appl. No. 12/548,187, mailed on Sep. 27, 2011, 19 pages.
Final Office Action for U.S. Appl. No. 12/395,871, mailed on Oct. 19, 2011, 33 pages.
Non-Final Office Action for U.S. Appl. No. 12/548,222, mailed on Oct. 19, 2011, 27 pages.
Non-Final Office Action for U.S. Appl. No. 12/548,281, mailed on Oct. 3, 2011, 37 pages.
Non-Final Office Action for U.S. Appl. No. 12/548,290, mailed on Oct. 3, 2011, 34 pages.
Notice of Allowance for U.S. Appl. No. 11/874,896, mailed on Jun. 23, 2011, 30 pages.
Final Office Action for U.S. Appl. No. 11/874,197, mailed on Aug. 12, 2011, 26 pages.
Notice of Allowance for U.S. Appl. No. 11/927,681, mailed on Jul. 1, 2011, 8 pages.
Final Office Action for U.S. Appl. No. 11/927,683, mailed on Sep. 1, 2011, 18 pages.
Arasu, A., et al., "The CQL Continuous Query Language: Semantic Foundations and Query Execution," Stanford University, The VLDB Journal—The International Journal on Very Large Data Bases, vol. 15, Issue 2, Springer-Verlag New York, Inc., Jun. 2006, pp. 1-32 (pp. 121-142 in publication).
Abadi, et al., "Aurora: A Data Stream Management System," International Conference on Management of Data, Proceedings of the 2003 ACM SIGMOD International Conference on Management of Data, ACM Press, 2003, 4 pages.
Aho, et al., "Efficient String Matching: an Aid to Bibliographic Search," Communications of the ACM, Jun. 1975, vol. 18, No. 6, pp. 333-340, Copyright 1975, Association for Computing Machinery, Inc.
Arasu, "CQL: A language for Continuous Queries over Streams and Relations," Lecture Notes in Computer Science, 2004, vol. 2921/2004, pp. 1-19.

Arasu, et al., "The CQL Continuous Query Language: Semantic Foundations and Query Execution," Stanford University, The VLDB Journal—The International Journal on Very Large Data Bases, Jun. 2006, vol. 15, issue 2, pp. 1-32, Springer-Verlag New York, Inc.
Arasu, et al., "An Abstract Semantics and Concrete Language for Continuous Queries over Streams and Relations," 9th International Workshop on Database programming languages, Sep. 2003, 11 pages.
Arasu, et al., "STREAM: The Stanford Data Stream Management System," Department of Computer Science, Stanford University, 2004, p. 21.
Avnur, et al., "Eddies: Continuously Adaptive Query Processing," In Proceedings of the 2000 ACM SIGMOD International Conference on Data, Dallas TX, May 2000, 12 pages.
Avnur, et al., "Eddies: Continuously Adaptive Query Processing," slide show, believed to be prior to Oct. 17, 2007, 4 pages.
Babu, et al., "Continuous Queries over Data Streams," SIGMOD Record, Sep. 2001, vol. 30, No. 3, pp. 109-120.
Bai, et al., "A Data Stream Language and System Designed for Power and Extensibility," Conference on Information and Knowledge Management, Proceedings of the 15th ACM International Conference on Information and Knowledge Management, Arlington, Virginia, Nov. 5-11, 2006, 10 pages, Copyright 2006, ACM Press.
Bose, et al., "A Query Algebra for Fragmented XML Stream Data", 9th International Conference on Data Base Programming Languages (DBPL), Sep. 6-8, 2003, Potsdam, Germany, at URL: http://lambda.uta.edu/dbpl03.pdf, 11 pages.
Buza, "Extension of CQL over Dynamic Databases," Journal of Universal Computer Science, 2006, vol. 12, No. 9, pp. 1165-1176.
Carpenter, "User Defined Functions," Oct. 12, 2000, at URL: http://www.sqlteam.com/itemprint.asp?ItemID=979, 4 pages.
Chan, et al., "Efficient Filtering of XML documents with Xpath expressions," VLDB Journal, 2002, pp. 354-379.
Chandrasekaran, et al., "TelegraphCQ: Continuous Dataflow Processing for an Uncertain World," Proceedings of CIDR 2003, 12 pages.
Chen, et al., "NiagaraCQ: A Scalable Continuous Query System for Internet Databases," Proceedings of the 2000 SIGMOD International Conference on Management of Data, May 2000, pp. 379-390.
Colyer, et al., "Spring Dynamic Modules Reference Guide," Copyright 2006-2008, ver. 1.0.3, 73 pages.
Colyer, et al., "Spring Dynamic Modules Reference Guide," Copyright 2006-2008, ver. 1.1.3, 96 pages.
"Complex Event Processing in the Real World," an Oracle White Paper, Sep. 2007, 13 pages.
Conway, "An Introduction to Data Stream Query Processing," Truviso, Inc., May 24, 2007, at URL: http://neilconway.org/talks/stream_intro.pdf, 71 pages.
"Coral8 Complex Event Processing Technology Overview," Coral8, Inc., Make it Continuous, pp. 1-8, Copyright 2007, Coral8, Inc.
"Creating WebLogic Domains Using the Configuration Wizard," BEA Products, Dec. 2007, ver. 10.0, 78 pages.
"Creating Weblogic Event Server Applications," BEA WebLogic Event Server, Jul. 2007, ver. 2.0, 90 pages.
Demers, et al., "Towards Expressive Publish/Subscribe Systems," Proceedings of the 10th International Conference on Extending Database Technology (EDBT 2006), Munich, Germany, Mar. 2006, pp. 1-18.
DeMichiel, et al., "JSR 220: Enterprise JavaBeans™, EJB 3.0 Simplified API," EJB 3.0 Expert Group, Sun Microsystems, May 2, 2006, ver. 3.0, 59 pages.
"Dependency Injection," Wikipedia, Dec. 30, 2008, printed on Apr. 29, 2011, at URL: http:en.wikipedia.org/w/index.php?title=Dependency_injection&oldid=260831402, pp. 1-7.
"Deploying Applications to WebLogic Server," BEA WebLogic Server, Mar. 30, 2007, ver. 10.0, 164 pages.
Deshpande, et al., "Adaptive Query Processing," slide show believed to be prior to Oct. 17, 2007, 27 pages.
"Developing Applications with Weblogic Server," BEA WebLogic Server, Mar. 30, 2007, ver. 10.0, 254 pages.
Diao, "Query Processing for Large-Scale XML Message Brokering," 2005, University of California Berkeley, 226 pages.

Diao, et al. "Query Processing for High-Volume XML Message Brokering", Proceedings of the 29th VLDB Conference, Berlin, Germany, 2003, 12 pages.

Dindar, et al., "Event Processing Support for Cross-Reality Environments," Pervasive Computing, IEEE CS, Jul.-Sep. 2009, pp. 2-9, Copyright 2009, IEEE.

"EPL Reference," BEA WebLogic Event Server, Jul. 2007, ver. 2.0, 82 pages.

Esper Reference Documentation, Copyright 2007, ver. 1.12.0, 158 pages.

Esper Reference Documentation, Copyright 2008, ver. 2.0.0, 202 pages.

"Fast Track Deployment and Administrator Guide for BEA WebLogic Server," BEA WebLogic Server 10.0 Documentation, printed on May 10, 2010, at URL: http://download.oracle.com/docs/cd/E13222_01/wls/docs100/quickstart/quick_start.html, 1 page.

Fernandez, et al., "Build your own XQuery processor", slide show, at URL: http://www.galaxquery.org/slides/edbt-summer-school2004.pdf, 2004, 116 pages.

Fernandez, et al., Implementing XQuery 1.0: The Galax Experience:, Proceedings of the 29th VLDB Conference, Berlin, Germany, 2003, 4 pages.

Florescu, et al., "The BEA/XQRL Streaming XQuery Processor," Proceedings of the 29th VLDB Conference, 2003, Berlin, Germany, 12 pages.

"Getting Started with WebLogic Event Server," BEA WebLogic Event Server, Jul. 2007, ver. 2.0, 66 pages.

Gilani, "Design and implementation of stream operators, query instantiator and stream buffer manager," Dec. 2003, 137 pages.

Golab, "Sliding Window Query Processing Over Data Streams," University of Waterloo, Waterloo, Ont. Canada, Aug. 2006, 182 pages.

Golab, et al., "Issues in Data Stream Management," ACM SIGMOD Record, vol. 32, issue 2, Jun. 2003, ACM Press, pp. 5-14.

Gosling, et al., "The Java Language Specification," Book, copyright 1996-2005, 3rd edition, 684 pages, Sun Microsystems USA. (due to size, reference will be uploaded in two parts).

Hopcroft, "Introduction to Automata Theory, Languages, and Computation," Second Edition, Addison-Wesley, Copyright 2001, 524 pages. (due to size, reference will be uploaded in two parts).

"Installing Weblogic Real Time," BEA WebLogic Real Time, Jul. 2007, ver. 2.0, 64 pages.

"Introduction to BEA WebLogic Server and BEA WebLogic Express," BEA WebLogic Server, Mar. 2007, ver. 10.0, 34 pages.

"Introduction to WebLogic Real Time," BEA WebLogic Real Time, Jul. 2007, ver. 2.0, 20 pages.

"Jboss Enterprise Application Platform 4.3 Getting Started Guide CP03, for Use with Jboss Enterprise Application Platform 4.3 Cumulative Patch 3," Jboss a division of Red Hat, Red Hat Documentation Group, Publication date Sep. 2007, Copyright 2008, 68 pages, Red Hat, Inc.

Jin, et al. "ARGUS: Efficient Scalable Continuous Query Optimization for Large-Volume Data Streams" 10th International Database Engineering and Applications Symposium (IDEAS'06), 2006, 7 pages.

Kawaguchi, "Java Architecture for XML Binding_(JAXB) 2.0," Sun Microsystems, Inc., Apr. 19, 2006, 384 pages.

Knuth, et al., "Fast Pattern Matching in Strings," Siam J. Comput., vol. 6, No. 2, Jun. 1977, pp. 323-350.

Lakshmanan, et al., "On efficient matching of streaming XML documents and queries," 2002, 18 pages.

Lindholm, et al., "Java Virtual Machine Specification, 2nd Edition", Prentice Hall, Apr. 1999, 484 pages. (due to size, reference will be uploaded in two parts).

Liu, et al., "Efficient XSLT Processing in Relational Database System," Proceeding of the 32nd. International Conference on Very Large Data Bases (VLDB), Sep. 2006, 1106-1116, 11 pages.

Luckham, "What's the Difference Between ESP and CEP?" Complex Event Processing, downloaded Apr. 29, 2011, at URL: http://complexevents.com/?p=103, 5 pages.

Madden, et al., "Continuously Adaptive Continuous Queries (CACQ) over Streams," SIGMOD 2002, Jun. 4-6, 2002, 12 pages.

"Managing Server Startup and Shutdown," BEA WebLogic Server, Mar. 30, 2007, ver. 10.0, 134 pages.

"Matching Behavior," .NET Framework Developer's Guide, Copyright 2008 Microsoft Corporation, downloaded Jul. 1, 2008 from URL: http://msdn.microsoft.com/en-us/library/0yzc2yb0(printer).aspx, pp. 1-2.

Motwani, et al., "Models and Issues in Data Streams," Proceedings of the 21st ACM SIGMOD-SIGACT-SIDART symposium on Principles f database systems, 2002, 30 pages.

Motwani, et al., "Query Processing Resource Management, and Approximation in a Data Stream Management System," Proceedings of CIDR 2003, Jan. 2003, 12 pages.

Munagala, et al., "Optimization of Continuous Queries with Shared Expensive Filters," Proceedings of the 26th ACM SIGMOD-SIGACT-SIGART symposium on Principles of database systems, believed to be prior to Oct. 17, 2007, p. 14.

"New Project Proposal for Row Pattern Recognition—Amendment to SQL with Application to Streaming Data Queries," H2-2008-027, H2 Teleconference Meeting, Jan. 9, 2008, pp. 1-6.

Novick, "Creating a User Defined Aggregate with SQL Server 2005," at URL: http://novicksoftware.com/Articles/sql-2005-product-user-defined-aggregate.html, 2005, 6 pages.

Oracle Database, SQL Language Reference, 11g Release 1 (11.1), B28286-02, Sep. 2007, 1496 pages, Oracle.

Oracle Application Server 10g, Release 2 and 3, New Features Overview, An Oracle White Paper, Oct. 2005, 48 pages, Oracle.

Oracle Application Server, Administrator's Guide, 10g Release 3 (10.1.3.2.0), B32196-01, Jan. 2007, 376 pages, Oracle.

Oracle Application Server, Enterprise Deployment Guide, 10g Release 3 (10.1.3.2.0), B32125-02, Apr. 2007, 120 pages, Oracle.

Oracle Application Server, High Availability Guide, 10g Release 3 (10.1.3.2.0), B32201-01, Jan. 2007, 314 pages, Oracle.

"Oracle CEP Getting Started," Release 11gR1 (11.1.1) E14476-01, May 2009, 172 pages.

Oracle Database Data Cartridge Developer's Guide, B28425-03, 11g Release 1 (11.1), Oracle, Mar. 2008, 372 pages, Oracle.

Oracle Database, SQL Reference, 10g Release 1 (10.1), Part No. B10759-01, Dec. 2003, pp. 7-1 to 7-17; 7-287 to 7-290; 14-61 to 14-74. (due to size, reference will be uploaded in three parts).

"OSGI Service Platform Core Specification, The OSGI Alliance," Apr. 2007, ver. 4.1, release 4, 288 pages, OSGI Alliance.

Peng, et al., "Xpath Queries on Streaming Data," 2003, pp. 1-12, ACM Press.

Peterson, "Petri Net Theory and the Modeling of Systems", Prentice Hall, 1981, 301 pages.

PostgresSQL: Documentation: Manuals: PostgresSQL 8.2: Create Aggregate, believed to be prior to Apr. 21, 2007, 4 pages.

PostgresSQL: Documentation: Manuals: PostgresSQL 8.2: User-Defined Aggregates, believed to be prior to Apr. 21, 2007, 4 pages.

"Release Notes," BEA WebLogic Event Server, Jul. 2007, ver. 2.0, 8 pages.

Sadri, et al., "Expressing and Optimizing Sequence Queries in Database Systems," ACM Transactions on Database Systems, Jun. 2004, vol. 29, No. 2, pp. 282-318, ACM Press, Copyright 2004.

Sadtler, et al., "WebSphere Application Server Installation Problem Determination," Copyright 2007, pp. 1-48, IBM Corp.

Sharaf, et al., Efficient Scheduling of Heterogeneous Continuous Queries, VLDB '06, Sep. 12-15, 2006, pp. 511-522.

Spring Dynamic Modules for OSGi Service Platforms product documentation, SpringSource, Jan. 2008, 71 pages.

"Stanford Stream Data Manager," at URL: http://infolab.stanford.edu/stream/, last modified Jan. 5, 2006, pp. 1-9.

Stolze, "User-defined Aggregate Functions in DB2 Universal Database," at URL: http://www.128.ibm.com/developerworks/db2/library/tacharticle/0309stolze/0309stolze.html, Sep. 11, 2003, 11 pages.

Stream Query Repository: Online Auctions (CQL Queries), at URL: http://www-db.stanford.edu/strem/sqr/cql/onauc.html, Dec. 2, 2002, 4 pages.

Stream Query Repository: Online Auctions, at URL: http://www-db.stanford.edu/stream/sqr/onauc.html#queryspecsend, Dec. 2, 2002, 2 pages.

"Stream: The Stanford Stream Data Manager," IEEE Data Engineering Bulletin, Mar. 2003, pp. 1-8.
Streambase 5.1 product documentation, Streambase Systems, copyright 2004-2010, 878 pages.
Terry, et al., "Continuous queries over append-only database," Proceedings of 1992 ACM SIGMOD, pp. 321-330.
"Understanding Domain Configuration," BEA WebLogic Server, Mar. 30, 2007, ver. 10.0, 38 pages.
Vajjhala, et al, "The Java™ Architecture for XML Binding (JAXB) 2.0," Sun Microsystem, Inc., Final Release Apr. 19, 2006, 384 pages.
W3C, "XML Path Language (Xpath)," W3C Recommendation, Nov. 16, 1999, ver. 1.0, at URL: http://www.w3.org/TR/xpath, 37 pages.
"WebLogic Event Server Administration and Configuration Guide," BEA WebLogic Event Server, Jul. 2007, ver. 2.0, 108 pages.
"WebLogic Event Server Reference," BEA WebLogic Event Server, Jul. 2007, ver. 2.0, 52 pages.
"Weblogic Server Performance and Tuning," BEA WebLogic Server, Mar. 30, 2007, ver. 10.0, 180 pages.
"WebSphere Application Server V6.1 Problem Determination: IBM Redpaper Collection," WebSphere Software, IBM/Redbooks, Dec. 2007, 634 pages.
White, et al., "WebLogic Event Server: A Lightweight, Modular Application Server for Event Processing," 2nd International Conference on Distributed Event-Based Systems, Jul. 2-4, 2008, Rome, Italy, 8 pages, ACM Press, Copyright 2004.
Widom, et al., "CQL: A Language for Continuous Queries over Streams and Relations," believed to be prior to Oct. 17, 2007, 62 pages.
Widom, et al., "The Stanford Data Stream Management System," PowerPoint Presentation, believed to be prior to Oct. 17, 2007, 110 pages.
Zemke," XML Query," Mar. 14, 2004, 29 pages.
De Castro Alves; et al, "Extensible Indexing Framework Using Data Cartridges," U.S. Appl. No. 12/913,636, filed Oct. 27, 2010.
Park, et al., "Spatial Data Cartridge for Event Processing Systems," U.S. Appl. No. 12/949,081, filed Nov. 18, 2010.
De Castro Alves; et al, "Extensibility Platform Using Data Cartridges," U.S. Appl. No. 12/957,194, filed Nov. 30, 2010.
De Castro Alves; et al, "Class Loading Using Java Data Cartridges," U.S. Appl. No. 13/089,556, filed Apr. 19, 2011.
De Castro Alves; et al, "Extensible Language Framework Using Data Cartridges," U.S. Appl. No. 12/957,201, filed Nov. 30, 2010.
Non-Final Office Action for U.S. Appl. No. 12/396,008, mailed on Jun. 8, 2011, 10 pages.
Non-Final Office Action for U.S. Appl. No. 12/395,871, mailed on May 27, 2011, 7 pages.
Non-Final Office Action for U.S. Appl. No. 11/874,202, mailed on Dec. 3, 2009, 20 pages.
Final Office Action for U.S. Appl. No. 11/874,202, mailed on Jun. 8, 2010, 200 pages.
Notice of Allowance for U.S. Appl. No. 11/874,202, mailed on Dec. 22, 2010, 29 pages.
Notice of Allowance for U.S. Appl. No. 11/874,202, mailed on Mar. 31, 2011, 12 pages.
Notice of Allowance for U.S. Appl. No. 11/874,850, mailed on Nov. 24, 2009, 17 pages.
Supplemental Notice of Allowance for U.S. Appl. No. 11/874,850, mailed on Dec. 11, 2009, 5 pages.
Supplemental Notice of Allowance for U.S. Appl. No. 11/874,850, mailed on Jan. 27, 2010, 11 pages.
Non-Final Office Action for U.S. Appl. No. 11/874,896, mailed on Dec. 8, 2009, 19 pages.
Final Office Action for U.S. Appl. No. 11/874,896, mailed on Jul. 23, 2010, 28 pages.
Non-Final Office Action for U.S. Appl. No. 11/874,896, mailed on Nov. 22, 2010, 25 pages.
Non-Final Office Action for U.S. Appl. No. 11/977,439, mailed on Apr. 13, 2010, 7 pages.
Notice of Allowance for U.S. Appl. No. 11/977,439, mailed on Aug. 18, 2010, 11 pages.
Supplemental Notice of Allowance for U.S. Appl. No. 11/977,439, mailed on Sep. 28, 2010, 6 pages.
Notice of Allowance for U.S. Appl. No. 11/977,439, mailed on Nov. 24, 2010, 8 pages.
Notice of Allowance for U.S. Appl. No. 11/977,439, mailed on Mar. 16, 2011, 10 pages.
Non-Final Office Action for U.S. Appl. No. 11/977,437, mailed on Oct. 13, 2009, 9 pages.
Final Office Action for U.S. Appl. No. 11/977,437, mailed on Apr. 8, 2010, 18 pages.
Notice of Allowance for U.S. Appl. No. 11/977,440, mailed on Oct. 7, 2009, 6 pages.
Office Action for U.S. Appl. No. 11/874,197, mailed on Nov. 10, 2009, 14 pages.
Final Office Action for U.S. Appl. No. 11/874,197, mailed on Jun. 29, 2010, 17 pages.
Non-Final Office Action for U.S. Appl. No. 11/874,197, mailed on Dec. 22, 2010, 22 pages.
Non-Final Office Action for U.S. Appl. No. 11/873,407, mailed on Nov. 13, 2009, 7 pages.
Final Office Action for U.S. Appl. No. 11/873,407, mailed on Apr. 26, 2010, 11 pages.
Notice of Allowance for U.S. Appl. No. 11/873,407, mailed on Nov. 10, 2010, 14 pages.
Notice of Allowance for U.S. Appl. No. 11/873,407, mailed on Mar. 7, 2011, 8 pages.
Non-Final Office Action for U.S. Appl. No. 11/601,415, mailed on Sep. 17, 2008, 10 pages.
Final Office Action for U.S. Appl. No. 11/601,415, mailed on May 27, 2009, 26 pages.
Advisory Action for U.S. Appl. No. 11/601,415, mailed on Aug. 18, 2009, 3 pages.
Non-Final Office Action for U.S. Appl. No. 11/601,415, mailed on Nov. 30, 2009, 32 pages.
Final Office Action for U.S. Appl. No. 11/601,415, mailed on Jun. 30, 2010, 45 pages.
Non-Final Office Action for U.S. Appl. No. 11/927,681, mailed on Mar. 24, 2011, 17 pages.
Non-Final Office Action for U.S. Appl. No. 11/927,683, mailed on Mar. 24, 2011, 13 pages.
Non-Final Office Action for U.S. Appl. No. 10/948,523, mailed on Jan. 22, 2007, 31 pages.
Final Office Action for U.S. Appl. No. 10/948,523, mailed on Jul. 6, 2007, 37 pages.
Non-Final Office Action for U.S. Appl. No. 10/948,523, mailed Dec. 11, 2007, 47 pages.
Notice of Allowance for U.S. Appl. No. 10/948,523, mailed on Jul. 8, 2008, 30 pages.
Supplemental Notice of Allowance for U.S. Appl. No. 10/948,523, mailed on Jul. 17, 2008, 4 pages.
Notice of Allowance for U.S. Appl. No. 10/948,523, mailed on Dec. 1, 2010, 17 pages.
Hao et al. "Achieving high performance web applications by service and database replications at edge servers," proceedings of IPCCC 2009, IEEE 28th International Performance Computing and Communications Conference, pp. 153-160 (Dec. 2009).
International Search Report dated for PCT/US2011/052019 (Nov. 17, 2011).
Office Action for U.S. Appl. No. 12/396,008 (Nov. 16, 2011).
Office Action for U.S. Appl. No. 12/534,398 (Nov. 11, 2011).
Office Action for U.S. Appl. No. 11/601,415 (Dec. 9, 2011).
"Oracle Complex Event Processing CQL Language Reference," 11g Release 1 (11.1.1) E12048-01, Apr. 2010, 540 pages.
Martin et al "Finding application errors and security flaws using PQL: a program query language," Proceedings of the 20th annual ACM SIGPLAN conference on Object-oriented programming, systems, languages, and applications 40:1-19 (Oct. 2005).
Office Action for U.S. Appl. No. 12/534,384 (Feb. 28, 2012).
Office Action for U.S. Appl. No. 12/506,905 (Mar. 26, 2012).
Office Action for U.S. Appl. No. 12/548,209 (Apr. 16, 2012).
Notice of Allowance for U.S. Appl. No. 13/184,528 (Mar. 1, 2012).
Office Action for U.S. Appl. No. 12/548,187 (Jun. 20, 2012).
Notice of Allowance for U.S. Appl. No. 12/395,871 (May 4, 2012).
Office Action for U.S. Appl. No. 12/548,222 (Jun. 20, 2012).
Office Action for U.S. Appl. No. 12/534,398 (Jun. 5, 2012).

Office Action for U.S. Appl. No. 12/548,281 (Jun. 20, 2012).
Office Action for U.S. Appl. No. 12/913,636 (Jun. 7, 2012).
Notice of Allowance for U.S. Appl. No. 12/874,197 (Jun. 22, 2012).
Final Office Action for U.S. Appl. No. 12/548,290 dated Jul. 30, 2012.
Office Action for U.S. Appl. No. 13/193,377 dated Aug. 23, 2012.
Office Action for U.S. Appl. No. 11/977,437 dated Aug. 3, 2012.
Final Office Action for U.S. Appl. No. 11/601,415 dated Jul. 2, 2012.
Final Office Action for U.S. Appl. No. 12/506,905 dated Aug. 9, 2012.
Esper Reference Documentation, Copyright 2009, ver. 3.1.0, 293 pages.
International Search Report dated Jul. 16, 2012 for PCT/US2012/034970.

* cited by examiner

STANDARDIZED DATABASE CONNECTIVITY SUPPORT FOR AN EVENT PROCESSING SERVER IN AN EMBEDDED CONTEXT

CROSS-REFERENCES TO RELATED APPLICATIONS

The present application incorporates by reference for all purposes the entire contents of the following related application: U.S. patent application Ser. No. 12/506,905, entitled "STANDARDIZED DATABASE CONNECTIVITY SUPPORT FOR AN EVENT PROCESSING SERVER," filed Jul. 21, 2009.

BACKGROUND OF THE INVENTION

Embodiments of the present invention relate to event stream processing, and more particularly relate to techniques for facilitating communication between one or more client applications and an event processing server.

Event stream processing (ESP) refers to the processing of one or more streams of data (e.g., event streams) with the goal of identifying meaningful information from those streams. An event stream is a linearly-ordered, continuous sequence of events. An event in an event stream is a tuple of data that represents, or encodes, an occurrence or activity. Typically, each event in an event stream is associated with (and is linearly-ordered by) a time. An example of an event stream is a stream of stock market price data received from a stock market data feed. In this example, the events in the stream may be tuples of (<stock symbol>, <stock price>) that are generated in real-time based on the movement of the stock market. Other types of event streams may be created in other contexts and domains, such a stream of sensor readings generated by a physical sensor or probe, a stream of network traffic events generated by a network monitor, and the like.

To facilitate the processing of event streams, a number of technology vendors have developed software and/or hardware-based ESP systems. These ESP systems typically include a server application (referred to herein as an event processing server) configured to receive event stream data and to perform various operations on that data on behalf of one or more client applications. For instance, an event processing server may receive commands and/or data from a client application for instantiating a new event stream, inserting data into an event stream, executing a continuous query against an event stream, etc. The event processing server may then process those commands accordingly and return a result (if applicable) to the client application.

A problem with existing ESP systems is that there is no standard Application Programming Interface (API) for communicating information between a client application and an event processing server. For example, there is no standard API for a client application to send commands and/or event stream data to an event processing server. Similarly, there is no standard API for the server to return processing results or other information to the client application.

Some existing event processing servers expose a proprietary interface for interacting with client applications. However, a proprietary interface requires each client application to implement custom code for invoking the interface. This, in turn, makes it difficult to migrate these client applications so that they can interoperate with different event processing server implementations provided by different vendors. Further, a proprietary interface may render an event processing server incompatible with existing/legacy client applications.

BRIEF SUMMARY OF THE INVENTION

Embodiments of the present invention provide techniques for facilitating communication between one or more client applications and an event processing server. In one set of embodiments, a framework is provided that enables a client application to communicate with an event processing server via a standard database connectivity API, such as Java Database Connectivity (JDBC).

According to another embodiment of the present invention, a method is provided for facilitating communication between a client application and an event processing server configured to run as part of a single computer process. The method comprises running, as part of the single computer process, a database connectivity adapter implementing a standard database connectivity API. The database connectivity adapter is configured to facilitate intra-process communication between the client application and the event processing server via the standard database connectivity API by receiving, in response to an invocation of the standard database connectivity API by the client application, a query language statement to be executed by the event processing server, parsing the query language statement to determine a type of the statement, and processing the query language statement based on its type. A procedure exposed by the event processing server is then invoked for executing the query language statement.

In one set of embodiments, the standard database connectivity API is JDBC and the query language statement is a CQL statement. In a further set of embodiments, the query language statement is a CQL statement for creating an event stream, a CQL statement for selecting data from an event stream, or a CQL statement for inserting data into an event stream.

In one set of embodiments, parsing the query language statement comprises determining whether the query language statement is a data modification language (DML) statement, such as insert. If the query language statement is a DML statement, the statement is processed by converting one or more data values included in the statement into a data representation native to the event processing server. Such conversion may comprise determining attribute datatypes for an event stream being modified by the query language statement and comparing the attribute datatypes to datatypes of the one or more data values included in the statement. If the attribute datatypes and the datatypes of the one or more data values are different but compatible, the datatypes of the one or more values may be converted into the attribute datatypes.

In one set of embodiments, if the query language statement is a DML statement, invoking a procedure exposed by the event processing server for executing the query language statement comprises invoking a procedure exposed by the event processing server for executing DML statements, where the procedure takes as an input parameter the data representation of the one or more data values native to the event processing server.

In one set of embodiments, parsing the query language statement comprises determining whether the query language statement is a data definition language (DDL) statement, such as create stream. If the query language statement is a DDL statement, the statement is not processed by the database connectivity adapter. Rather, a procedure exposed by the event processing server for executing DDL statements is invoked, where the procedure takes as an input parameter the query language statement. In various embodiments, the server-side procedure for executing DDL statements is configured to parse the query language statement to determine a DDL type of the statement, perform one or more validations with respect to the statement based on the parsing, and invoke another procedure of the event processing server to execute the statement.

In one set of embodiments, invoking a procedure exposed by the event processing server from the database connectivity adapter comprises obtaining a reference to a local object instantiated by the event processing server and invoking a method of the local object.

In one set of embodiments, the client application is a data source (or an application associated with a data source) configured to generate an event stream. In another set of embodiments, the client application is a data integrator configured to aggregate event streams from a plurality of different data sources.

According to another embodiment of the present invention, a system is provided. The system comprises a storage component configured to store data for one or more event streams, and a processing component configured to run a client application, a database connectivity adapter, and an event processing server as part of a single computer process, where the database connectivity adapter implements a standard database connectivity API, and where the database connectivity adapter is configured to facilitate intra-process communication between the client application and the event processing server via the standard database connectivity API. In one set of embodiments, the database connectivity adapter is configured to receive, in response to a invocation of the standard database connectivity API by the client application, a query language statement to be executed by the event processing server, parse the query language statement to determine a type of the statement. The database connectivity adapter is further configured to process the query language statement based on its type, and invoke a procedure of the event processing server for executing the query language statement.

According to another embodiment of the present invention, a machine-readable storage medium is provided having stored thereon program code which, when executed by a processing component of a computer system, causes the processing component to facilitate communication between a client application and an event processing server configured to run as part of a single computer process. The program code comprises code for a database connectivity adapter configured to run as part of the single computer process, where the database connectivity adapter implements a standard database connectivity API, and where the database connectivity adapter is configured to facilitate intra-process communication between the client application and the event processing server via the database connectivity API. In one set of embodiments, the database connectivity adapter is configured to receive, in response to an invocation of the standard database connectivity API by the client application, a query language statement to be executed by the event processing server, and parse the query language statement to determine a type of the statement. The database connectivity adapter is further configured to process the query language statement based on its type, and invoke a procedure exposed by the event processing server for executing the query language statement.

The foregoing, together with other features and embodiments, will become more apparent when referring to the following specification, claims, and accompanying drawings.

DETAILED DESCRIPTION OF THE INVENTION

In the following description, for the purposes of explanation, specific details are set forth in order to provide a thorough understanding of embodiments of the present invention. It will be apparent, however, that the present invention may be practiced without some of these details.

Embodiments of the present invention provide techniques for facilitating communication between a client application and an event processing server via a standard database connectivity API. In one set of embodiments, a database connectivity adapter is provided that implements a standard database connectivity API, such as Java Database Connectivity (JDBC). The database connectivity adapter is configured to process an invocation of the standard database connectivity API by the client application, where the invocation specifies a query language statement (e.g., a Continuous Query Language (CQL) statement) to be executed by the event processing server. Once the invocation is processed, the database connectivity adapter is configured to invoke an appropriate internal procedure/method exposed by the event processing server for executing the query language statement. In this manner, the client application may interact with the event processing server via a single, standard interface (e.g., the standard database connectivity API) rather than via a proprietary mechanism.

In one set of embodiments, the techniques of the present invention may be applied to environments where the client application and the event processing server are configured to run on separate systems or as separate computer processes. In another set of embodiments, the techniques of the present invention may be applied to environments where the client application and the event processing server are configured to run as part of a single computer process.

Figure 1:
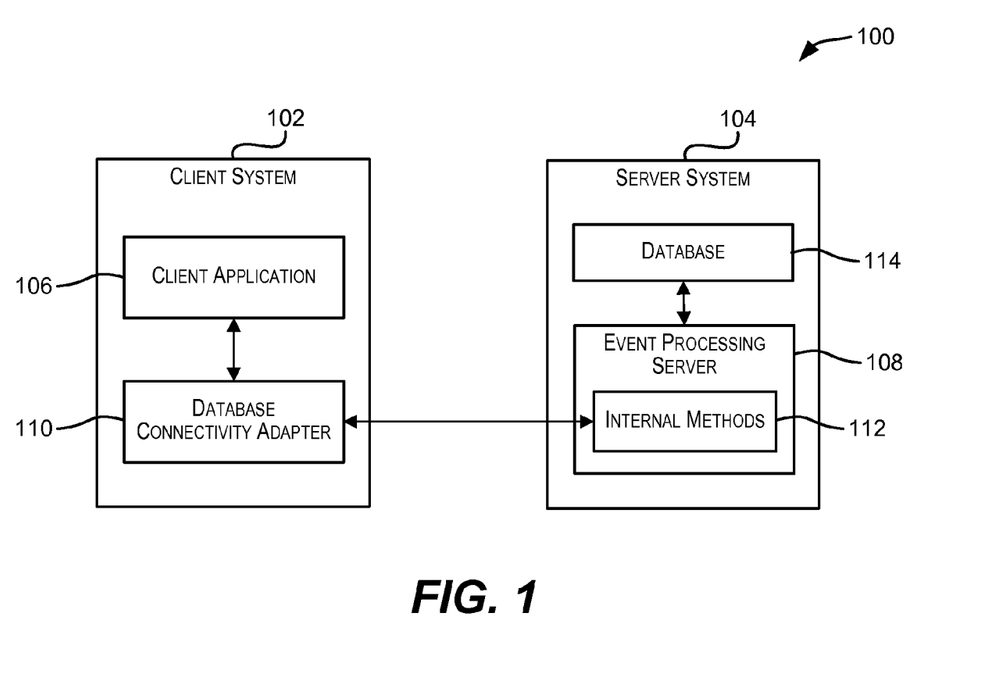
FIG. 1 is a simplified block diagram illustrating functional components of a system environment that may incorporate an embodiment of the present invention.

FIG. 1 is a simplified block diagram illustrating functional components of a system environment 100 that may incorporate an embodiment of the present invention. As shown, system environment 100 comprises, inter alia, a client system 102 running a client application 106 and a server system 104 running an event processing server 108.

In various embodiments, event processing server 108 is an entity that is configured to receive event streams and process those event streams for various purposes. As described previously, an event stream is an unbounded sequence of events (or tuples) that are ordered by time. An example of an event processing server is the Oracle Complex Event Processor available from Oracle Corporation.

Client application 106 is an entity that is configured to interact with an event processing server by sending commands and/or event stream data to the server. For example, in the embodiment of FIG. 1, client application 106 may be configured to send event stream data (e.g., tuples) to event processing server 108 for insertion into an event stream maintained by server 108. Client application 106 may also be configured to send commands to event processing server 108 for instantiating a new event stream, executing a continuous query against one or more event streams, and the like. In one set of embodiments, client application 106 may be associated with a data source that generates event stream data (e.g., a database, messaging service, physical probe or sensor, etc.). In another set of embodiments, client application 106 may be a data integrator (e.g., Oracle Data Integrator) configured to aggregate event stream data from variety of different data sources.

In one set of embodiments, client application 106 is configured to use a standard programming interface, rather than a proprietary programming interface, for interacting with event processing server 108. In a particular set of embodiments, client application 106 is configured to use a standard database connectivity API. As used herein, a standard database connectivity API is a set of interfaces and/or classes for interacting with a database server that is not specific to any particular database implementation. An example of a standard database connectivity API is JDBC. By using a standard database connectivity API, client application 106 can be easily migrated to interoperate with other event processing server implementations that support the standard API.

To facilitate communication between client application 106 and event processing server 108 via a standard database connectivity API, system environment 100 includes a database connectivity adapter 110. Database connectivity adapter 110 comprises one or more code modules that implement the functions of the standard database connectivity API. For example, in the case of JDBC, database connectivity adapter 110 may be a JDBC driver that implements the interfaces and classes defined by JDBC.

Database connectivity adapter 110 acts as an communications abstraction layer between client application 106 and event processing server 108. For example, in one set of embodiments, database connectivity adapter 110 consumes invocations of the standard database connectivity API by client application 106, where the invocations specify query language statements to be executed by event processing server 108. Database connectivity adapter 110 then invokes appropriate internal procedures/methods (e.g., internal methods 112) exposed by event processing server 108 for executing the query language statements. In this manner, client application 106 does not need to implement custom code for calling the internal methods of event processing server 108 directly; rather, client application 106 can simply invoke the standard database connectivity interface, which is then processed by database connectivity adapter 110 to enable communication with event processing server 108. The processing performed by database connectivity adapter 110 is discussed in greater detail with respect to FIGS. 2 and 3 below.

In the embodiment of FIG. 1, database connectivity adapter 110 is shown as running on client system 102. In this type of configuration, database connectivity adapter 110 may use a remote invocation interface, such as Java Remote Method Invocation (RMI), to obtain a reference to the internal methods of event processing server 108 and to invoke those methods remotely. However, in alternative embodiments, the processing of database connectivity adapter 110 may be carried out on server system 104, or on another system not depicted in FIG. 1. Further, in some embodiments, client application 106, event processing server 108, and database connectivity adapter 110 may all run as part of a single computer process on a single system. This may occur in deployments where the event processing server is embedded into the client application. This embedded scenario is discussed in greater detail with respect to FIG. 4 below.

As shown, system environment 100 also includes a database 114. Database 114 is a repository for storing data and metadata pertaining to event streams processed by server 108. In one set of embodiments, database 114 is a relational database, such as Oracle 10g. Although database 114 is illustrated as residing on server system 104, it should be appreciated database 114 may also reside on one or more separate systems communicatively coupled with server system 104. One of ordinary skill the art would recognize many variations, modifications, and alternatives.

Figure 2:
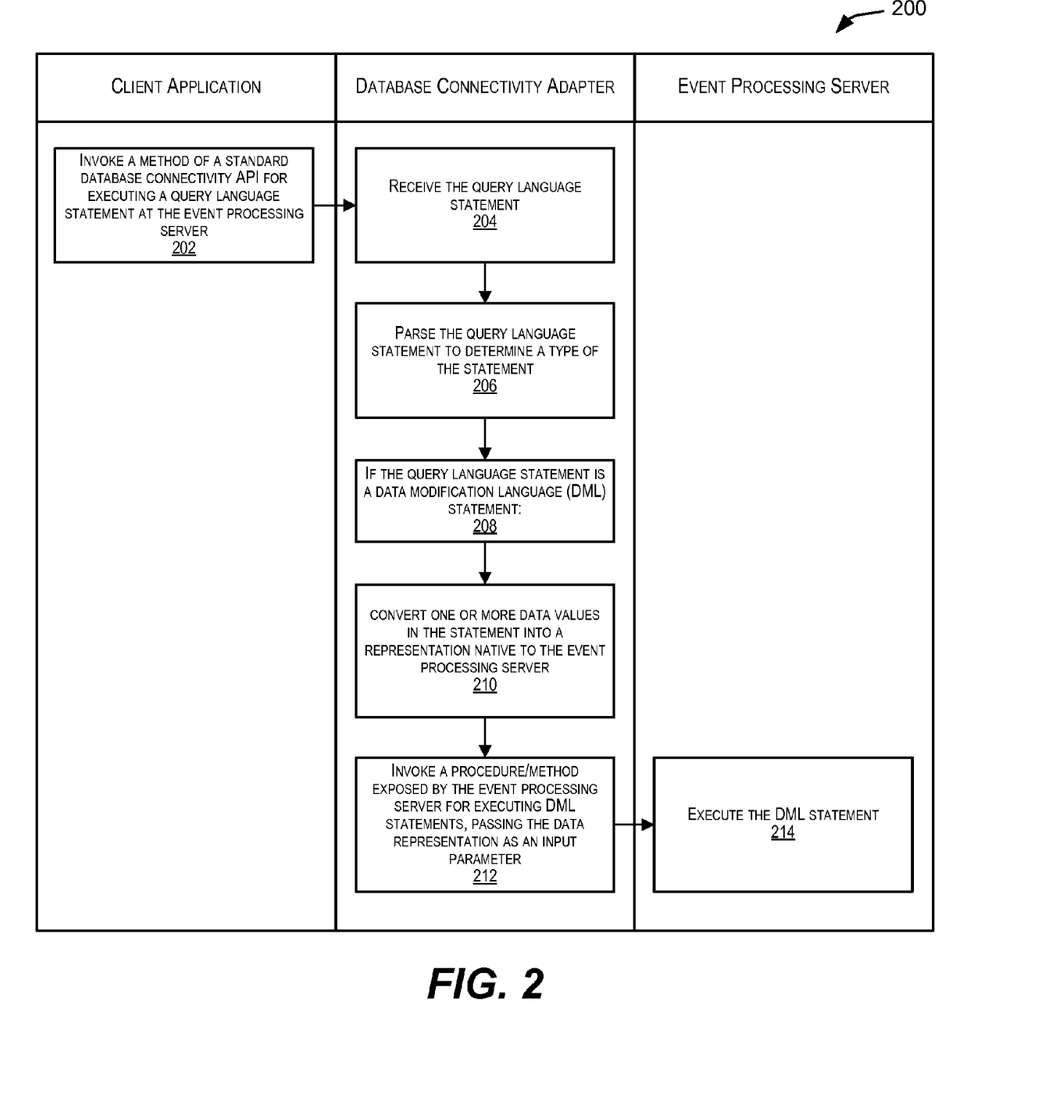
FIG. 2 is a flow diagram illustrating a first method for enabling communication between a client application and an event processing server via a standard database connectivity API in accordance with an embodiment of the present invention.

FIG. 2 is a flow diagram 200 illustrating a method for facilitating communication between a client application and an event processing server in accordance with an embodiment of the present invention. In particular, flow diagram 200 illustrates steps that may be carried out by client application 106, database connectivity adapter 110, and event processing server 108 of FIG. 1 for enabling interaction between application 106 and server 108 via a standard database connectivity API. In various embodiments, the processing of flow diagram 200 may be implemented in software, hardware, or combinations thereof. Further, the processing of flow diagram 200 may be encoded as program code stored on a machine-readable medium.

At step 202, a client application (e.g., client application 106) invokes a method of a standard database connectivity API for executing a query language statement at an event processing server (e.g., event processing server 108). For example, if the standard database connectivity API is JDBC, the client application may execute program code similar to the following pseudocode:

```
// Instantiate database connectivity adapter
Class.forName("com.jdbc.databaseconnectivityadapter");'
// Get connection to event processing server {
conn = DriverManager.getConnection ("jdbc:ServerURL","Login", "Password");
// Create a query language statement
stmt = conn.createStatement( );
} catch (Exception e) {
System.out.println("Exception: " + e.getMessage( ));
// Execute the statement
try {
stmt.executeUpdate(my_statement);
} catch (Exception e) {
System.out.println("Exception: " + e.getMessage( ));
}
```

In the code example above, the client application creates an instance of a database connectivity adapter (e.g., database connectivity adapter 110), receives a handle to a connection with the event processing server via the adapter, and then executes the statement "my_statement" by invoking the standard JDBC method "ExecuteUpdate" (or, alternatively, "ExecuteQuery"). In an embodiment, the statement is formatted according to a query language that is specifically designed to operate on event streams, such as Continuous Query Language (CQL). For example, the query language statement may be a CQL "create stream" statement, a CQL "insert" statement, a CQL "select" statement, or the like.

Once the database connectivity API has been invoked by the client application, the query language statement is received at the database connectivity adapter and the query language statement is parsed by the adapter to determine a type of the statement (steps 204, 206). Generally speaking, there are at least two types of query language statements: (1) statements that modify data, known as data modification language (DML) statements, and (2) statements that define data structures, known as data definition language (DDL) statements. Examples of CQL statements that are considered DML statements include "insert." Examples of CQL statements that are considered DDL statements include "create stream," "create relation," and "select." In one set of embodiments, the parsing performed at step 206 determines whether the query language statement is a DML statement or a DDL statement.

The remainder of the processing of flow diagram 200 assumes that the query language statement is a DML statement, such as CQL insert statement. A different series of steps may be performed if the query language statement is a DDL statement, which is described with respect to FIG. 3 below.

If the query language statement is a DML statement (step 208), the database connectivity adapter is configured to convert data values in the statement into a data representation native to the event processing server (step 210). For example, if the query language statement is a CQL insert statement, it will typically be bound with data values to be inserted into an event stream. These data values are converted into a native data representation (known as a tuple representation) understood by the event processing server.

Generally speaking, this native data representation converts the data values provided in the DML statement into tuples that reflect the data structure of the event stream. For example, if the event stream is defined as having an integer attribute and a float attribute, the data values in the DML statement would be converted into tuples of (integer, float). These tuples are then passed to the event processing server, where they can be directly inserted into the event stream without any further conversions.

In one set of embodiments, the conversion process performed at step 210 may include datatype conversions between different but compatible datatypes. For example, returning to the example above, assume that the event stream being modified comprises an integer attribute and a float attribute. However, assume that the DML statement is bound with two integer values. In this case, since the integer datatype is compatible with the float datatype, one of the integer values may be automatically converted to the float datatype in the tuple representation.

In another set of embodiments, the conversion process performed at step 210 may include generating timestamp information if such information is not included in the DML statement. For example, assume the DML statement is CQL insert statement and binds one or more data values to be inserted into an event stream. If the insert statement specifies timestamps for the one or more data values, these timestamps are added to the tuple representation generated at step 210. However, if the insert statement does not specify timestamps for one or more data values, the database connectivity adapter may generate timestamps for those values and add these generated timestamps to the tuple representation.

Once the data values in the DML statement have been converted, the database connectivity adapter invokes an internal procedure/method exposed by the event processing server for executing DML statements (step 212). In one set of embodiments, this procedure takes the native data representation (e.g., tuple representation) of the data values as an input parameter. The DML statement is then executed at the event processing server (step 214).

Figure 3:
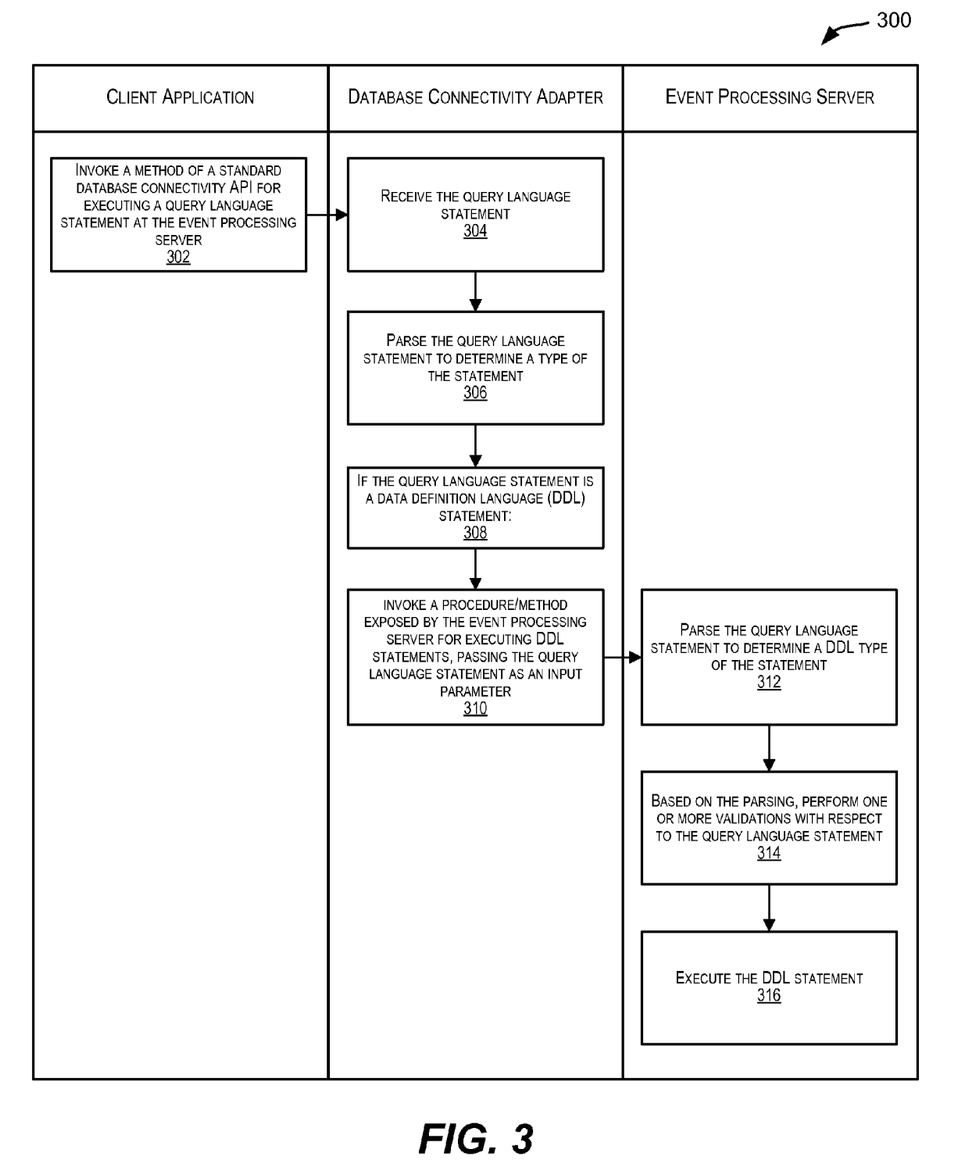
FIG. 3 is a flow diagram illustrating a second method for enabling communication between a client application and an event processing server via a standard database connectivity API in accordance with an embodiment of the present invention.

FIG. 3 is a flow diagram 300 illustrating a second method for facilitating communication between a client application (e.g., client application 106 of FIG. 1) and an event processing server (e.g., event processing server 108 of FIG. 1) via a standard database connectivity API in accordance with an embodiment of the present invention. As shown, the initial steps of flow diagram 300 (steps 302, 304, 306) are substantially similar to the initial steps of flow diagram 200 (steps 202, 204, 206). However, the remainder of flow diagram 300 illustrates steps that may be performed if the query language statement specified by the client application is a DDL, rather than a DML, statement. Like flow diagram 200, the processing of flow diagram 300 may be implemented in software, hardware, or combinations thereof. Further, the processing of flow diagram 300 may be encoded as program code stored on a machine-readable medium.

At step 308, the query language statement received by the database connectivity adapter (step 304) is determined to be a DDL statement. In response, the database connectivity adapter invokes a procedure/method exposed by the event processing server for executing DDL statements, and passes the query language statement as an input parameter (step 310). For example, the adapter may pass the query language statement as a string value. Note that, unlike flow diagram 200, no further processing of the query language statement takes place at the database connectivity adapter.

In response to invoking the server-side procedure, a server-side parser is configured to parse the DDL statement to determine a DDL type of the statement (step 312). For example, the server-side parser may determine whether the statement is a "create stream" statement, a "create relation" statement, etc. Based on this parsing, one or more validations may be performed with respect to the DDL statement (step 314). In one set of embodiments, these validations may include validating data in the DDL statement against metadata for one or more event streams maintained by the event processing server. For example, a "create stream" statement will generally include a name for the new stream. This name may be validated against the names of existing event streams to ensure that a duplicate event stream is not created. Similar metadata validations may be performed for other types of DDL statements.

Once the validations have been performed, another internal procedure/method of the event processing server is invoked, thereby causing the DDL statement to be executed (step 316).

Although not shown in FIG. 3, in one set of embodiments an alternative sequence of steps may be performed if the DDL statement parsed at step 306 is determined to be a "select" statement. In these embodiments, the database connectivity adapter may parse the select statement to determine the column names specified in the "SELECT" clause and the tables or view names specified in the "FROM" clause. The database connectivity adapter may then pass the table/view names to a method exposed by the event processing server for obtaining metadata related to the specified tables/views. For example, the method may return to the database connectivity adapter the datatypes and sizes (if applicable) of each column in the specified tables/views. The database connectivity adapter may then filter this metadata information based on the columns specified in the "SELECT" clause of the select statement and pass the filtered metadata information back to the client application. For example, in one embodiment, the database connectivity adapter may generate an empty result set that specifies the datatypes and sizes of each column in the result set and return the empty result set to the client application. In this manner, the database connectivity adapter can interoperate with certain client applications (such as Oracle ODI) that use select statements to retrieve metadata information about specific database tables.

It should be appreciated that the specific steps illustrated in FIGS. 2 and 3 provide particular methods for facilitating communication between a client application and an event processing server via a standard database connectivity API according to embodiments of the present invention. Other sequences of steps may also be performed according to alternative embodiments. For example, individual steps illustrated in FIGS. 2 and 3 may include multiple sub-steps that may be performed in various sequences as appropriate to the individual step. Further, additional steps may be added, or existing steps may be removed, depending on the particular application. Further, one or more steps attributed to a particular entity in FIGS. 2 and 3 (e.g., client application, database connectivity adapter, event processing server) may be performed by another entity. One of ordinary skill in the art would recognize many variations, modifications, and alternatives.

Figure 4:
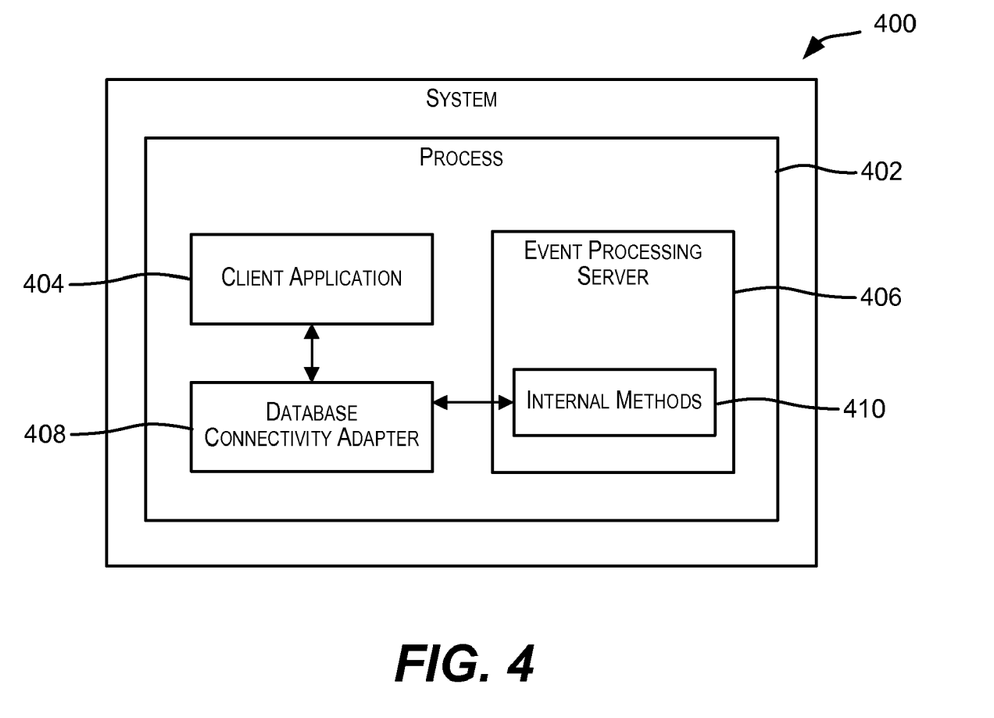
FIG. 4 is a simplified block diagram illustrating functional components of a system that may incorporate an embodiment of the present invention.

In one set of embodiments, the techniques of the present invention may be applied to environments where a client application and an event processing server are configured to run as part of a single computer process. For example, the client application and the event processing server may be configured to run as separate threads within a single process, or as a single thread within the single process. This situation may occur, for example, in deployments where an instance of the event processing server is embedded in a client application to avoid possible performance problems stemming from communication over a network. FIG. 4 is a simplified block diagram illustrating such an environment.

As shown, FIG. 4 comprises a system 400 running a computer process 402. Within computer process 402 are instances of a client application 404, an event processing server 406, and a database connectivity adapter 408. Generally speaking, client application 404, event processing server 406, and database connectivity adapter 408 are configured to operate substantially similarly to their counterparts in system environment 100 of FIG. 1. However, rather than using a remote invocation interface to invoke the internal methods (e.g., internal methods 410) of event processing server 406, database connectivity adapter 408 can obtain a reference to a local object (e.g., class instance) exposing methods 410. Adapter 408 may then invoke methods 410 via the local object.

In some embodiments, client application 404 may be configured to interact with event processing server 406 via one or more custom API extensions when in the embedded context. In an embodiment, these custom API extensions comprise extensions to the standard database connectivity API. The use of such extensions allows for improved performance when a client application and an event processing server are running in the same computer process, but allows the event processing server to remain compatible with other client applications that may only implement the standard database connectivity API.

Figure 5:
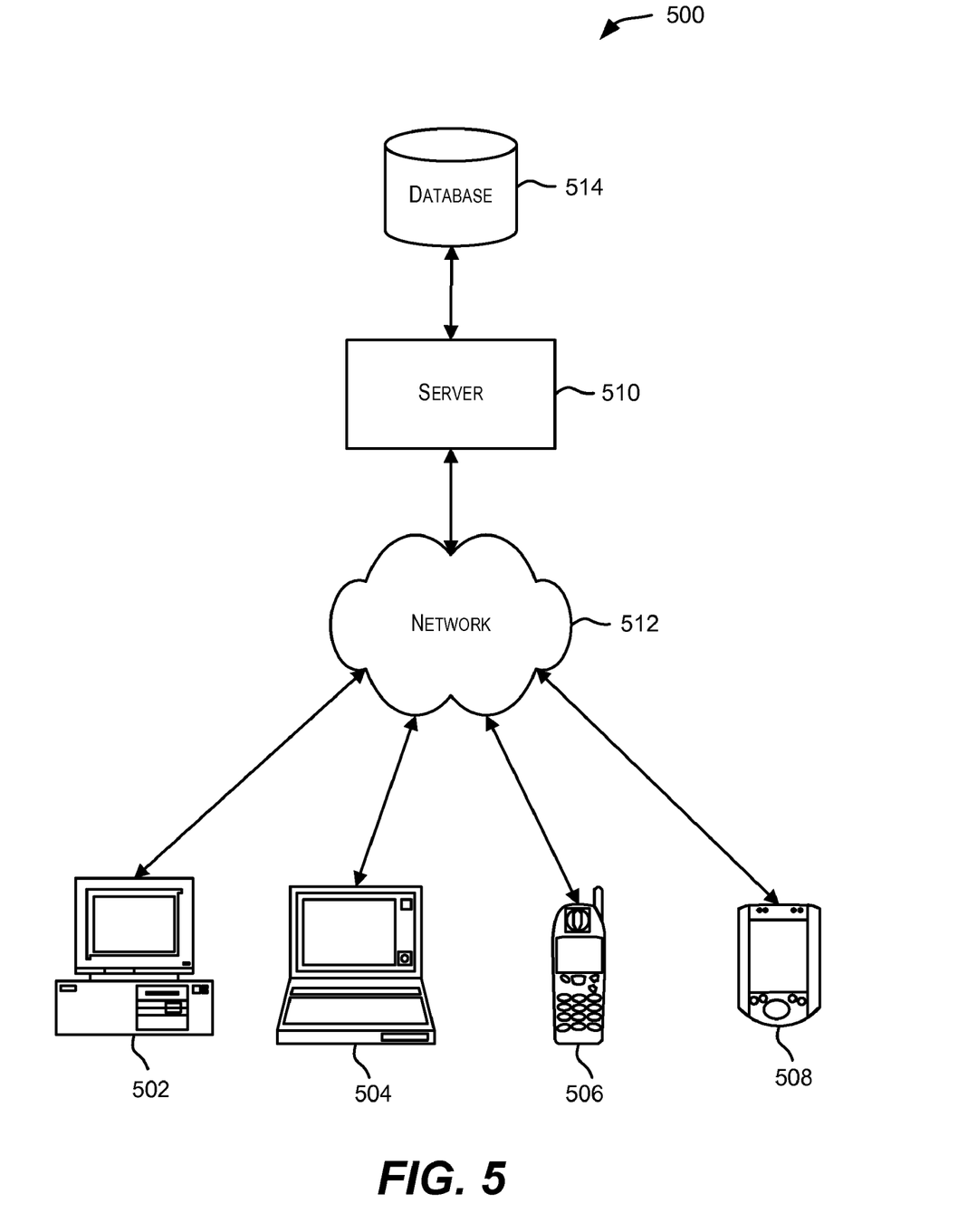
FIG. 5 is a simplified block diagram illustrating physical components of a system environment that may incorporate an embodiment of the present invention.

FIG. 5 is a simplified block diagram illustrating physical components of a system environment 500 that may incorporate an embodiment of the present invention. As shown, system environment 500 includes one or more client computing devices 502, 504, 506, 508 communicatively coupled with a server computer 510 via a network 512. In one set of embodiments, client computing devices 502, 504, 506, 508 may correspond to instances of client system 102 of FIG. 1 and may be configured to run one or more client-side applications such as client application 106 and database connectivity adapter 110 of FIG. 1. Further, server computer 510 may correspond to an instance of server system 104 of FIG. 1 and may be configured to run one or more server-side applications such as event processing server 108 of FIG. 1. Although system environment 500 is shown with four client computing devices and one server computer, any number of client computing devices and server computers may be supported.

Client computing devices 502, 504, 506, 508 may be general purpose personal computers (including, for example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, and/or other communication protocol enabled), and/or workstation computers running any of a variety of commercially-available UNIX or UNIX-like operating systems (including without limitation the variety of GNU/Linux operating systems). Alternatively, client computing devices 502, 504, 506, and 508 may be any other electronic device capable of communicating over a network (e.g., network 512 described below) with server computer 510.

Server computer 510 may be a general purpose computer, specialized server computer (including, e.g., a LINUX server, UNIX server, mid-range server, mainframe computer, rack-mounted server, etc.), server farm, server cluster, or any other appropriate arrangement and/or combination. Server computer 510 may run an operating system including any of those discussed above, as well as any commercially available server operating system. Server computer 510 may also run any of a variety of server applications and/or mid-tier applications, including web servers, Java virtual machines, application servers, database servers, and the like. As indicated above, in one set of embodiments, server computer 510 is adapted to run one or more server and/or middle-tier components (such as event processing server 108 of FIG. 1) that are configured to receive event stream data from client computing devices 502, 504, 506, 508 and perform operations with respect to that data.

As shown, client computing devices 502, 504, 506, 508 and server computer 510 are communicatively coupled via network 512. Network 512 may be any type of network that can support data communications using any of a variety of commercially-available protocols, including without limitation TCP/IP, SNA, IPX, AppleTalk, and the like. Merely by way of example, network 512 may be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 500 may also include one or more databases 514. In one set of embodiments, database 514 corresponds to an instance of database 114 of FIG. 1, and is configured to store data and metadata for one or more event streams operated on by an event processing server running on server computer 510. Database 514 may also correspond to any other database or data storage component discussed in the present disclosure. Database 514 may reside in a variety of locations. By way of example, database 514 may reside on a storage medium local to (and/or resident in) one or more of the computers 502, 504, 506, 508, 310. Alternatively, database 514 may be remote from any or all of the computers 502, 504, 506, 508, 510 and/or in communication (e.g., via network 512) with one or more of these. In one set of embodiments, database 514 may reside in a storage-area network (SAN) familiar to those skilled in the art. Similarly, any necessary files for performing the functions attributed to the computers 502, 504, 506, 508, 510 may be stored locally on the respective computer and/or remotely on database 514, as appropriate. In one set of embodiments, database 514 is a relational database, such as Oracle 10g available from Oracle Corporation. In particular embodiment, database 514 is adapted to store, update, and retrieve event stream data in response to CQL-formatted commands received at server computer 510.

Figure 6:
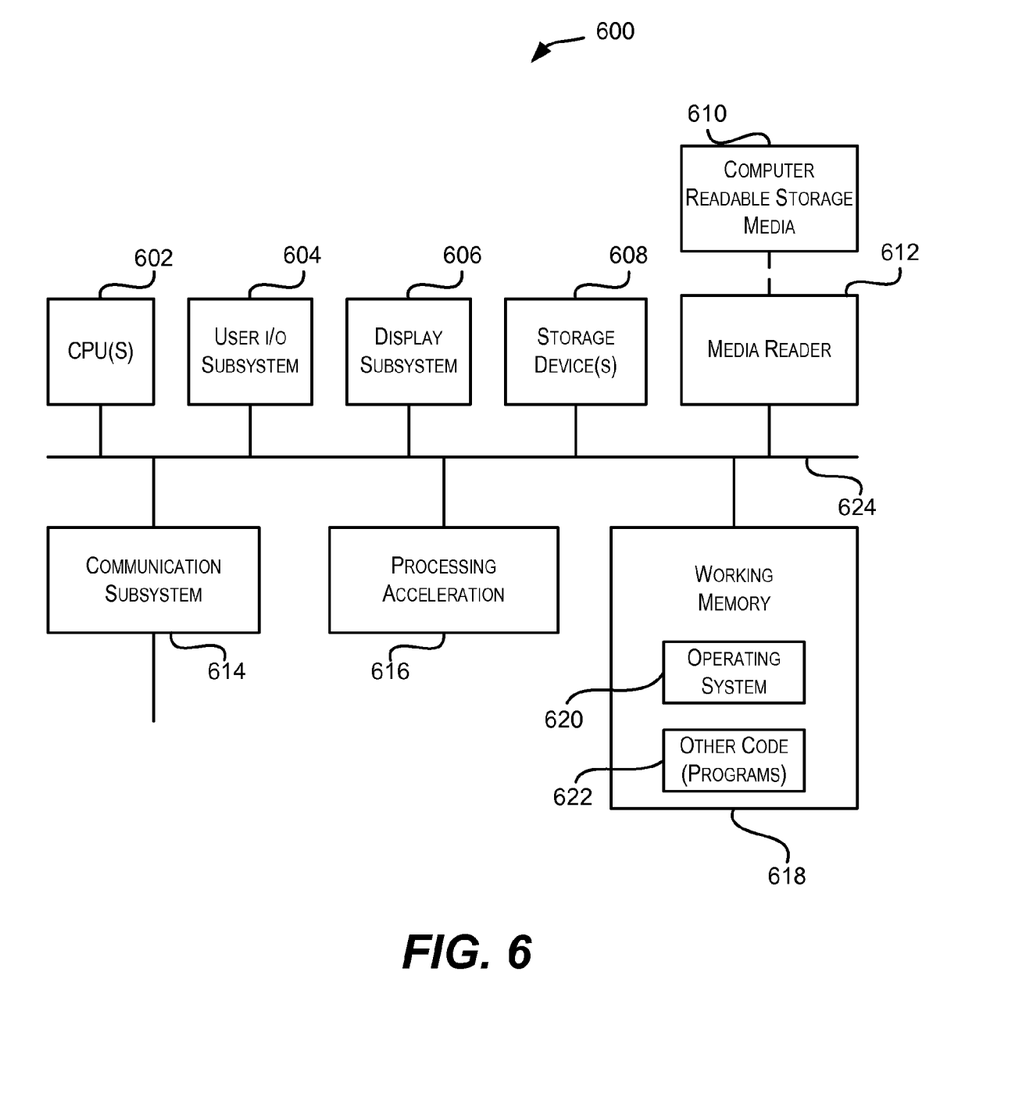
FIG. 6 is a simplified block diagram illustrating physical components of a computer system that may incorporate an embodiment of the present invention.

FIG. 6 is a simplified block diagram illustrating physical components of a computer system 600 that may incorporate an embodiment of the present invention. In various embodiments, computer system 600 may be used to implement any of the computers 502, 504, 506, 508, 510 illustrated in system environment 500 described above. In one embodiment, computer system 600 may be configured to operate the functional components/applications illustrated in system 400 of FIG. 4. As shown in FIG. 6, computer system 600 comprises hardware elements that may be electrically coupled via a bus 624. The hardware elements may include one or more central processing units (CPUs) 602, one or more input devices 604 (e.g., a mouse, a keyboard, etc.), and one or more output devices 606 (e.g., a display device, a printer, etc.). Computer system 600 may also include one or more storage devices 608. By way of example, storage device(s) 608 may include devices such as disk drives, optical storage devices, and solid-state storage devices such as a random access memory (RAM) and/or a read-only memory (ROM), which can be programmable, flash-updateable and/or the like.

Computer system 600 may additionally include a computer-readable storage media reader 612, a communications subsystem 614 (e.g., a modem, a network card (wireless or wired), an infra-red communication device, etc.), and working memory 618, which may include RAM and ROM devices as described above. In some embodiments, computer system 600 may also include a processing acceleration unit 616, which can include a digital signal processor (DSP), a special-purpose processor, and/or the like.

Computer-readable storage media reader 612 can further be connected to a computer-readable storage medium 610, together (and, optionally, in combination with storage device (s) 608) comprehensively representing remote, local, fixed, and/or removable storage devices plus storage media for temporarily and/or more permanently containing computer-readable information. Communications system 614 may permit data to be exchanged with network 512 of FIG. 5 and/or any other computer described above with respect to system environment 500.

Computer system 600 may also comprise software elements, shown as being currently located within working memory 618, including an operating system 620 and/or other code 622, such as an application program (which may be a client application, Web browser, mid-tier application, RDBMS, etc.). In a particular embodiment, working memory 618 may include executable code and associated data structures for client application 106, database connectivity adapter 110, and/or event processing server 108 of FIG. 1. It should be appreciated that alternative embodiments of computer system 600 may have numerous variations from that described above. For example, customized hardware might also be used and/or particular elements might be implemented in hardware, software (including portable software, such as applets), or both. Further, connection to other computing devices such as network input/output devices may be employed.

In one set of embodiments, the techniques described herein may be implemented as program code executable by a computer system (such as a computer system 600) and may be stored on machine-readable media. Machine-readable media may can include any appropriate media known or used in the art, including storage media and communication media, such as (but not limited to) volatile and non-volatile, removable and non-removable media implemented in any method or technology for storage and/or transmission of information such as machine-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store or transmit the desired information and which can be accessed by a computer.

Although specific embodiments of the present invention have been described, various modifications, alterations, alternative constructions, and equivalents are within the scope of the invention. For example, embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. The scope of the invention should be determined not with reference to the above description, but instead should be determined with reference to the pending claims along with their full scope or equivalents.

What is claimed is:

1. A method for facilitating communication between a client application and an event processing server configured to run as part of a single computer process, the method comprising:

running, as part of the single computer process, a database connectivity adapter implementing a database connectivity API, wherein the database connectivity adapter is configured to facilitate intra-process communication between the client application and the event processing server via the database connectivity API by:

receiving, in response to an invocation of the database connectivity API by the client application, a query language statement to be executed by the event processing server;

parsing the query language statement to determine a type of the statement;

processing the query language statement based on its type; and invoking a procedure of the event processing server for executing the query language statement by (1) the database connectivity adapter obtaining a reference to a local object instantiated by the event processing server within the same single computer process as the database connectivity adapter and (2) the database connectivity adapter invoking a method of the local object, the invocation of the method of the local object causing execution of the query language statement.

2. The method of claim 1 wherein the database connectivity API is Java Database Connectivity (JDBC).

3. The method of claim 1 wherein the query language statement is an Continuous Query Language (CQL) statement.

4. The method of claim 3 wherein the query language statement is a CQL statement for creating an event stream, a CQL statement for selecting data from an event stream, or a CQL statement for inserting data into an event stream.

5. The method of claim 1 wherein parsing the query language statement to determine a type of the statement comprises determining whether the query language statement is a data modification language (DML) statement.

6. The method of claim 5 wherein if the query language statement is a DML statement, processing the query language statement based on its type comprises:
    converting one or more data values included in the query language statement into a data representation native to the event processing server.

7. The method of claim 6 wherein converting one or more data values included in the query language statement into a data representation native to the event processing server comprises:
    determining attribute datatypes for an event stream being modified by the query language statement;
    comparing the attribute datatypes to datatypes of the one or more data values; and
    if the attribute datatypes and the datatypes of the one or more data values are different but compatible, converting the datatypes of the one or more data values into the attribute datatypes.

8. The method of claim 6 wherein if the query language statement is a DML statement, invoking a procedure of the event processing server for executing the query language statement comprises:
    invoking a procedure of the event processing server for executing DML statements, wherein the procedure takes as an input parameter the data representation of the one or more data values native to the event processing server.

9. The method of claim 1 wherein parsing the query language statement to determine a type of the statement comprises determining whether the query language statement is a data definition language (DDL) statement.

10. The method of claim 9 wherein if the query language statement is a DDL statement, invoking a procedure of the event processing server for executing the query language statement comprises:
    invoking a procedure of the event processing server for executing DDL statements, wherein the procedure takes as an input parameter the query language statement.

11. The method of claim 10 wherein the procedure of the event processing server for executing DDL statements is configured to:
    parse the query language statement to determine a DDL type of the query language statement;
    based on the parsing, perform one or more validations with respect to the query language statement; and
    invoke another procedure of the event processing server to execute the query language statement.

12. The method of claim 1 wherein the client application is a data source configured to generate an event stream.

13. The method of claim 1 wherein the client application is a data integrator configured to aggregate event streams from a plurality of different data sources.

14. A system comprising:
    a storage component configured to store data for one or more event streams; and
    a processing component communicatively coupled with the storage component, the processing component being configured to:
        run a client application, a database connectivity adapter, and an event processing server as part of a single computer process, wherein the database connectivity adapter implements a database connectivity API, and wherein the database connectivity adapter is configured to facilitate intra-process communication between the client application and the event processing server via the database connectivity API by:
            receiving, in response to an invocation of the database connectivity API by the client application, a query language statement to be executed by the event processing server;
            parsing the query language statement to determine a type of the statement;
            processing the query language statement based on its type; and
            invoking a procedure of the event processing server for executing the query language statement by (1) the database connectivity adapter obtaining a reference to a local object instantiated by the event processing server within the same single computer process as the database connectivity adapter and (2) the database connectivity adapter invoking a method of the local object, the invocation of the method of the local object causing execution of the query language statement.

15. A non-transitory machine-readable medium having stored thereon program code which, when executed by a processing component of a computer system, causes the processing component to facilitate communication between a client application and an event processing server configured to run as part of a single computer process, the program code comprising:
    code for a database connectivity adapter configured to run as part of the single computer process, wherein the code for the database connectivity adapter comprises one or more code modules implementing a database connectivity API, and wherein the database connectivity adapter is configured to facilitate intra-process communication between the client application and the event processing server via the database connectivity API by:
        receiving, in response to an invocation of the standard database connectivity API by the client application, a query language statement to be executed by the event processing server;
        parsing the query language statement to determine a type of the statement;
        processing the query language statement based on its type; and
        invoking a procedure of the event processing server for executing the query language statement by (1) the database connectivity adapter obtaining a reference to a local object instantiated by the event processing server within the same single computer process as the database connectivity adapter and (2) the database connectivity adapter invoking a method of the local object, the invocation of the method of the local object causing execution of the query language statement.

* * * * *

UNITED STATES PATENT AND TRADEMARK OFFICE
CERTIFICATE OF CORRECTION

PATENT NO. : 8,321,450 B2  
APPLICATION NO. : 12/506891  
DATED : November 27, 2012  
INVENTOR(S) : Thatte et al.

Page 1 of 1

It is certified that error appears in the above-identified patent and that said Letters Patent is hereby corrected as shown below:

On page 3, in column 2, under "Other Publications", line 26-27, delete "http://lambda,uta." and insert -- http://lambda.uta. --, therefor.

On page 4, in column 1, under "Other Publications", line 53, delete "1Oth" and insert -- 10th --, therefor.

On page 4, in column 2, under "Other Publications", line 8, delete "SIDART" and insert -- SIGART --, therefor.

On page 4, in column 2, under "Other Publications", line 46, delete "PostgresSQL:" and insert -- PostgreSQL: --, therefor.

On page 4, in column 2, under "Other Publications", line 46, delete "PostgresSQL" and insert -- PostgreSQL --, therefor.

On page 4, in column 2, under "Other Publications", line 48, delete "PostgresSQL:" and insert -- PostgreSQL: --, therefor.

On page 4, in column 2, under "Other Publications", line 48, delete "PostgresSQL" and insert -- PostgreSQL --, therefor.

Signed and Sealed this  
Twenty-sixth Day of February, 2013

Teresa Stanek Rea  
*Acting Director of the United States Patent and Trademark Office*